United States Patent
Kikuta et al.

(10) Patent No.: US 6,915,136 B2
(45) Date of Patent: Jul. 5, 2005

(54) MOBILE COMMUNICATION METHOD AND MOBILE COMMUNICATION SYSTEM

(75) Inventors: Yoko Kikuta, Kanagawa (JP); Masami Yabusaki, Chiba (JP)

(73) Assignee: NTT DoCoMo, Inc., Tokyo (JP)

( * ) Notice: Subject to any disclaimer, the term of this patent is extended or adjusted under 35 U.S.C. 154(b) by 549 days.

(21) Appl. No.: 10/044,854

(22) Filed: Nov. 7, 2001

(65) Prior Publication Data

US 2002/0077129 A1 Jun. 20, 2002

(30) Foreign Application Priority Data

Nov. 10, 2000 (JP) ........................................ 2000-343887

(51) Int. Cl.⁷ ........................... H04Q 7/20; H04M 3/42; H04M 5/00
(52) U.S. Cl. .................... 455/461; 455/463; 455/435.1; 455/422; 379/211; 379/279; 379/267
(58) Field of Search ................................ 455/461, 463, 455/435.1, 422, 428, 560, 458, 445, 434, 439, 13.3, 131.3, 417, 414.1, 432.1, 410; 379/211, 279, 84, 268, 221.12, 221.13, 177

(56) References Cited

U.S. PATENT DOCUMENTS

| 2,303,023 | A | * | 11/1942 | Cier | ............................ 208/45 |
| 5,390,241 | A | * | 2/1995 | Bales et al. | ............. 379/201.05 |
| 5,666,356 | A | | 9/1997 | Fleming et al. | ............. 370/328 |
| 5,926,755 | A | * | 7/1999 | Ghisler | ....................... 455/509 |
| 6,259,782 | B1 | * | 7/2001 | Gallant | .................. 379/211.01 |
| 6,393,275 | B1 | * | 5/2002 | Alfred | ...................... 455/422.1 |
| 6,434,385 | B1 | * | 8/2002 | Aucoeur | ..................... 455/430 |
| 6,449,483 | B1 | * | 9/2002 | Akhteruzzaman et al. | .. 455/445 |
| 6,469,994 | B1 | * | 10/2002 | Ueda | ........................... 370/329 |
| 6,564,050 | B1 | * | 5/2003 | Ramey et al. | .............. 455/416 |
| 6,643,524 | B1 | * | 11/2003 | Ishii et al. | ................... 455/560 |
| 6,668,166 | B1 | * | 12/2003 | Kanabar | ..................... 455/411 |
| 6,687,350 | B1 | * | 2/2004 | Landry et al. | ......... 379/144.04 |
| 6,687,605 | B1 | * | 2/2004 | Wako | ......................... 701/201 |
| 6,690,933 | B1 | * | 2/2004 | Chapman et al. | ........ 455/414.1 |
| 2001/0039188 | A1 | * | 11/2001 | Amereller et al. | .......... 455/417 |

FOREIGN PATENT DOCUMENTS

| EP | 0 495 692 A2 | 7/1992 | |
| EP | 1 033 898 A1 | 6/2000 | |
| EP | 1022920 A2 | 7/2000 | ............ H04Q/7/38 |
| JP | 11-234748 | 8/1999 | |
| WO | WO 94/29992 A | 12/1994 | |
| WO | WO 99/39535 | 8/1999 | ............ H04Q/7/38 |

OTHER PUBLICATIONS

Austrian Patent Office Service and Information Sector (TRF) Singapore Application 200106886-5.

* cited by examiner

Primary Examiner—William Trost
Assistant Examiner—Kiet Doan
(74) Attorney, Agent, or Firm—Workman Nydegger

(57) ABSTRACT

Any one of a plurality of terminals sharing the same number determines whether or not to switch a transfer to any of the other terminals sharing the same number. If it determines that the transfer is to be switched, it authenticates one terminal among the other terminals sharing the same number, and then outputs a transfer switching request according to the authenticated terminal to a communication control station. The communication control station performs a transfer switching process concerning the authenticated terminal based on the transfer switching request outputted from the first terminal.

13 Claims, 4 Drawing Sheets

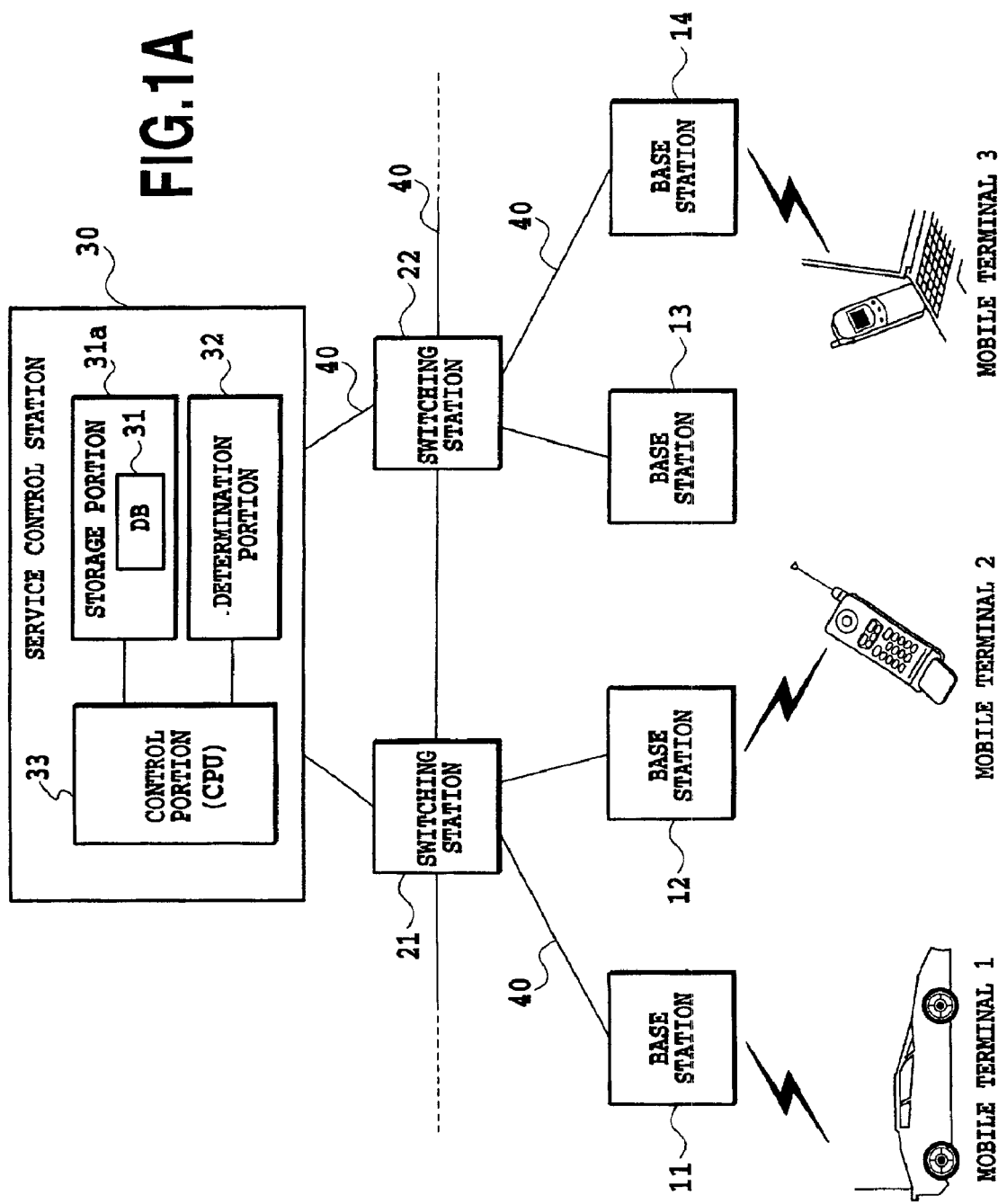
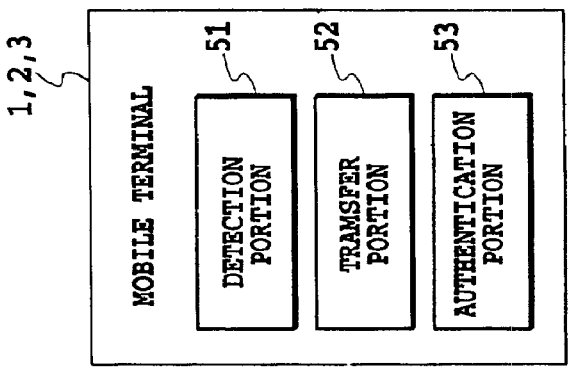

| TELEPHONE NUMBER (41) | DEVICE NUMBER (42) | LOCATION INFORMATION (43) | AVAILABILITY FLAG (44) |
|---|---|---|---|
| MSN1 | MSI1 | A11 | 1 |
| | MSI2 | A12 | 0 |
| | MSI3 | A13 | 0 |

FIG.2

MOBILE COMMUNICATION METHOD AND MOBILE COMMUNICATION SYSTEM

This application claims priority under 35 U.S.C. 119 to Patent Application No. 2000-343887 filed Nov. 10, 2000 in Japan, the content of which is incorporated hereinto by reference.

BACKGROUND OF THE INVENTION

1. Field of the Invention

The present invention relates to a mobile communication method and a mobile communication system wherein, in the case of sharing a plurality of mobile terminals for users, a call being communicated can be switched and transferred to another available mobile terminal.

2. Description of Related Art

With the recent spread of mobile communications, users have become more and more opportunities to use a plurality of mobile terminals as required.

For example, a plurality of mobile terminals for business and personal communications, or a vehicle-mounted high-power terminal and a light and small mobile terminal, or a PC card type data communication terminal and a mobile terminal with a voice function can be used as required.

With a conventional mobile communication system, a user can use the same telephone number for a plurality of mobile terminals to which the user is subscribed (Japanese Patent Application Laid-open No. 11-234748).

However, switching operations for mobile terminals are limited to one from a mobile terminal that is unavailable during the switching operation, and switching operations from an available mobile terminal are not permitted.

Further, switching operations for mobile terminals are limited to only while all of the mobile terminals are being controlled during non-communicating.

As a result, the following problems may occur.

First, to allow a plurality of mobile terminals to use the same telephone number, the device numbers of desired mobile terminals must be registered preliminarily in a database in a service control station.

Furthermore, while a user under such a contract that the same telephone number can be communicated by using a plurality of the mobile terminals, if it has become difficult to continue the communication due to the exhaustion of batteries in the mobile terminal or worsened conditions for radio wave propagation, then in spite of the plurality of mobile terminals available for the same telephone number, the user cannot continue the communication by switching a call being communicated by this mobile terminal to another mobile terminal because the switching operation is not permitted while one of the mobile terminals is used for the communication.

SUMMARY OF THE INVENTION

It is an object of the present invention to provide a mobile communication method and a mobile communication system wherein, when it becomes difficult to continue the communication while a user is communicating by using one mobile terminal, a user can switch a call being communicated to another terminal available for the same number to continue the communication, thus improving the user's convenience.

In a first aspect of the present invention, there is provided a mobile communication method for controlling a transfer switching during communication between a plurality of terminals sharing a same number and a communication control station, wherein any one of the plurality of terminals comprises steps of:

determining whether or not to switch a transfer to any of the terminals sharing the same number;

authenticating, if it is determined that the transfer is to be switched, one of the terminals sharing the same number to which the transfer is switched; and outputting a transfer switching request according to the authenticated terminal to the communication control station, and wherein the communication control station comprises a step of:

performing a process of switching the transfer to the authenticated terminal based on the transfer switching request outputted from the terminal.

Here, if the one terminal is communicating, this terminal may automatically authenticate one of the other terminals with which the terminal can communicate by using the same number, and the authenticating terminal may output a transfer switching request according to the another authenticated terminal to the communication control station.

If the one terminal is communicating, this terminal may automatically authenticate one of the other terminals with which the terminal can communicate by using the same number, and the another authenticated terminal may output a transfer switching request according to the authenticated terminal to the communication control station.

The communication control station may further comprise steps of:

storing a switching request information concerning the transfer switching request corresponding to the each terminal sharing the same number;

determining whether the authenticating terminal or the another authenticated terminal has provided an output; and performing, if it is determined that the another terminal has provided an output, a process of switching the transfer based on the switching request information stored in the storage means.

In a second aspect of the present invention, there is provided a mobile communication system for controlling a transfer switching during communication between a plurality of terminals sharing a same number and a communication control station, wherein any one of the plurality of terminals comprises:
determination means for determining whether or not to switch a transfer to any of the terminals sharing the same number;

authentication means for authenticating, if it is determined that the transfer is to be switched, one of the terminals sharing the same number to which the transfer is switched; and output means for outputting a transfer switching request according to the authenticated terminal to the communication control station, and wherein the communication control station comprises:
transfer switching means for performing a process of switching the transfer to the authenticated terminal based on the transfer switching request outputted from the terminal.

Here, the authentication means may comprise:
if the one terminal is communicating, this terminal may automatically authenticate one of the other terminals with which the terminal can communicate by using the same number, and the output means may comprise:
the authenticating terminal may output a transfer switching request according to the another authenticated terminal to the communication control station.

The authentication means may comprise:

if the one terminal is communicating, this terminal may automatically authenticate one of the other terminals with which the terminal can communicate by using the same number, and the output means may comprise:

the another authenticated terminal may output a transfer switching request according to the authenticated terminal to the communication control station.

The communication control station may further comprise:

storage means for storing a switching request information concerning the transfer switching request corresponding to the each terminal sharing the same number;

determination means for determining whether the authenticating terminal or the another authenticated terminal has provided an output; and control means for performing, if it is determined that the another terminal has provided an output, a transfer switching process based on the switching request information stored in the storage means.

In a third aspect of the present invention, there is provided a communication control station for controlling a transfer switching for communication between a plurality of terminals sharing the same number, the station comprises of:

storage means for storing a switching request information concerning a transfer switching request corresponding to the each terminal sharing the same number; and control means for performing a transfer switching process based on the switching request information stored in the storage means.

The switching request information stored in the storage means may include at least the same number shared among terminals, a device number, a location information and an availability flag, wherein the location information and the availability flag correspond to the device number.

In a fourth aspect of the present invention, there is provided a terminal device for controlling a transfer switching for communication between other terminals sharing a same number, the device comprises of:

detection means for detecting a terminal available for the same number;

transfer request means for performing a transfer request to the detected terminal available for the same number, and authentication request means for performing an authentication request based on the transfer request received from the terminal available for the same number.

In a fifth aspect of the present invention, there is provided a method for controlling a transfer switching for communication between at least two terminals sharing a same number, the method comprises the steps of:

detecting a terminal available for the same number among terminals sharing the same number of the predetermined terminal, performing a transfer request to the detected terminal available for the same number, and performing an authentication request based on the transfer request received from the terminal available for the same number.

The above and other objects, effects, features and advantages of the present invention will become more apparent from the following description of embodiments thereof taken in conjunction with the accompanying drawings.

BRIEF DESCRIPTION OF DRAWINGS

FIGS. 1A and 1B are block diagrams showing the entire configuration of a mobile communication system as a first embodiment of the present invention;

FIG. 2 is an explanatory representation showing the configuration of a database included a service control station;

DESCRIPTION OF THE PREFERRED EMBODIMENTS

Figure 3:
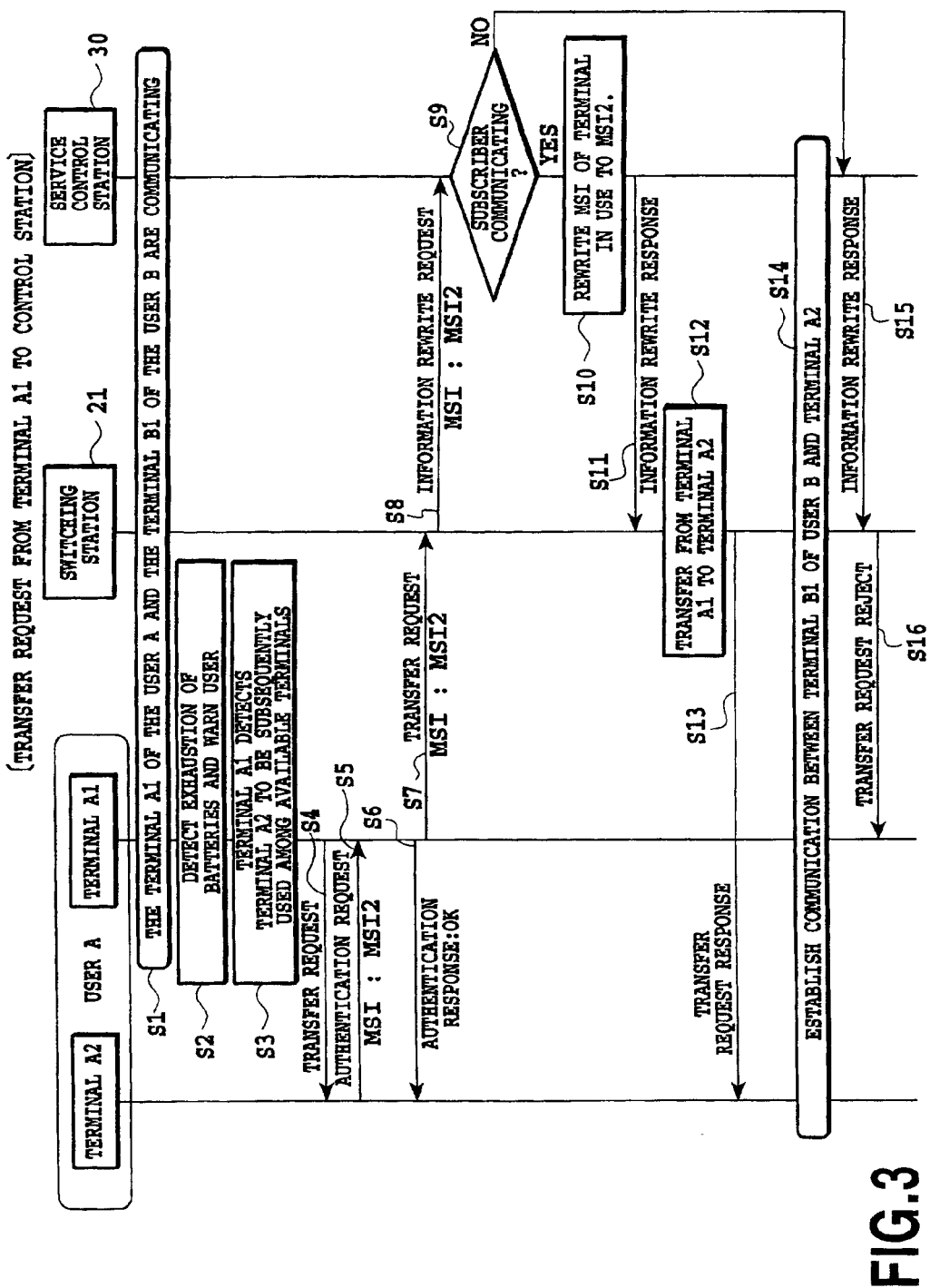
FIG. 3 is a flow chart showing an example of a process in the case of performing a transfer request during communication from a source mobile terminal to a network.

Embodiments of the present invention will be described below in detail with reference to the drawings.

FIRST EXAMPLE

First, a first embodiment of the present invention will be described with reference to FIGS. 1 to 3.

(Summary)

The present invention relates to a mobile communication system composed of one or more terminals that can share the same number and a service control apparatus having a storage area storing the device numbers of the one or more terminals and locational information corresponding to one number, wherein a call being communicated by using one of the terminals is switched and transferred to another terminal available for the same number.

That is, when one of the terminals is communicating, authentication process is performed between the communicated terminal and another terminal available for the same number to switch the call. In other words, when one of the terminals is communicating, another terminal available for the same number can be detected automatically to switch the call being communicated.

(SPECIFIC EXAMPLE)

A specific example will be described below.

(System Configuration)

First, the configuration of the system will be described.

FIGS. 1A and 1B show an example of the configuration of a mobile communication system according to the present invention.

This mobile communication system is composed of mobile terminals 1 to 3, base stations 11 to 14, switching stations 21 to 22, a service control station 30, and a communication line 40 that connects these components together.

The mobile terminals 1 to 3 are used by the same subscriber and are imparted with individual device numbers MSI1, MSI2, and MSI3 as well as a common telephone number MSN, respectively.

In this case, the mobile terminal 1 is mounted in a vehicle, the mobile terminal 2 is portable, and the mobile terminal 3 is integrated with a data communication card.

In the following description, in which the same telephone number can be shared by a plurality of mobile terminals, users will be referred to as "multiple terminal subscribers".

As shown in FIG. 1B, the mobile terminals 1 to 3 include a detection portion 51, a transfer portion 52 and an authentication portion 53.

The detection portion 51 has a function that detects a terminal available for the same number (ex. the same telephone number).

The transfer portion 52 has a function that performs a transfer request to the detected terminal available for the same number.

The authentication portion 53 has a function that performs an authentication request based on said transfer request received from said terminal available for the same number.

The mobile terminals 1 to 3 support short-distance radio communications using bluetooth waves (very weak radiowaves) or the like and can communicate directly with each other.

The base stations 11 to 14 are installed at predetermined intervals and have a function of communicating a mobile terminal in a radio zone formed by each station.

The switching stations 21 and 22 accommodate a plurality of base stations and communicate with slave base stations and other switching stations to connect calls to the mobile terminals 1 to 4.

Reference numeral 30 denotes a service control station internally having a database (DB) 31. This station 30 provides various pieces of information referring to the mobile terminals for the switching stations 21 to 22.

As shown in FIGS. 1A and 1B, the service control station includes a storage portion 31a having the database 31, a determination portion 32 and a control portion 33.

The storage portion 31a has a function that stores a switching request information (see availability flag in FIG. 2) concerning the transfer switching request corresponding to each terminal sharing the same number.

The determination portion 32 has a function that determines whether an authenticating terminal or an another authenticated terminal has provided an output.

The control portion 33 has a function that performs, if it is determined that the another terminal has provided an output, a process of switching the transfer based on the switching request information stored in the storage portion 31a.

FIG. 2 shows the contents of data stored in the database 31 within the service control station 30.

A reference numeral 41 denotes a telephone number storage portion that stores subscribers' telephone numbers. A reference numeral 42 denotes a device number storage portion that stores one or more device numbers corresponding to one telephone number. A reference numeral 43 denotes a location information portion that stores the numbers of areas in which the mobile terminal corresponding to each the device number is present. A reference numeral 44 denotes an availability flag that stores "1" if the mobile terminal is available and stores "0" if the mobile terminal is unavailable.

Here, a mobile terminal set to "1", indicating that it is available, is one of the group of mobile terminals to which the same telephone number is assigned. The other mobile terminals are set to "0", indicating that they are unavailable.

The device number storage portion 42 stores the device numbers MSI1, MSI2, and MSI3, corresponding to the three mobile terminals 1 to 3, to which the telephone number MSN1 is assigned. The location information section 43 stores location information (terminal-located area numbers) A11, A12, and A13 on each mobile terminal corresponding to the device numbers MSI1, MSI2, and MSI3. In the availability flags 44 corresponding to the device numbers MSI1, MSI2, and MSI3, the one corresponding to the device number MSI1 is set to "1" indicating available, whereas the other mobile terminals are set to "0" indicating unavailable.

(System Operation)

Now, an operation of this system will be described.

(1) If a source terminal performs a transfer request

The case in which a source terminal performs a transfer request will be described below.

FIG. 3 is a sequence diagram showing the case in which while a user A is communicating by using the mobile terminal 1 (hereafter referred to as the "mobile terminal A1"), a transfer request is performed from the mobile terminal A1 being used to a mobile communication network.

The user A is a multiple terminal subscriber and can use the mobile terminals A1, A2, and A3, to which the telephone number MSN1 is assigned. The mobile terminals A1, A2, and A3 have the device numbers MSI1, MSI2, and MSI3, respectively.

While the mobile terminal A1 of the user A and the mobile terminal B1 of the user B (hereafter referred to as a "mobile terminal B1") are communicating (step S1), if the mobile terminal A1 has become the difficulty continuing the communication due to the exhaustion of batteries, it autonomously detects the exhaustion and warns the user A of the difficulty by activating an alarm, displaying a character message on a liquid crystal screen, or lighting a warning lamp (step S2).

The mobile terminal A1 detects the mobile terminal A2, which is located around and is available for continuing the current communication, among the mobile terminals A2 and A3 which can be used with the same telephone number MSN1 (step S3). The mobile terminal A1 then transmits a transfer request to the mobile terminal A2 (step S4).

In this case, means for selecting the mobile terminal A2 may be either a method of allowing the mobile terminal A1 to autonomously detect the mobile terminal A2 or a method of allowing the user A, who has been warned of the exhaustion, to intentionally select the mobile terminal A2.

Upon receiving the transfer request from the mobile terminal A1, the mobile terminal A2 transmits the device number MSI2 to the mobile terminal A1 to perform an authentication request (step S5).

If the result of the authentication is affirmative, the mobile terminal A1 notifies the mobile terminal A2 of this result (step S6) and performs a transfer request to the switching station 21 so that the device number MSI1 is changed to the device number MSI2 (step S7).

Upon receiving the transfer request from the mobile terminal A1, the switching station 21 transmits an information rewrite request of the device number of the terminal being used to the service control station 30 (step S8).

The service control station 30 determines whether or not this subscriber is being communicated (step S9). If the subscriber is being communicated, the service control station 30 assumes that the transfer can be permitted, and then rewrites the availability flag in the database 31 (step S10). The service control station 30 then sets the availability state of the device number MSI2 to "1", and transmits an information rewrite response to the switching station 21 (step S11).

This process sets the availability state of the mobile terminal A2 having the device number MSI2 to "1", indicating that the terminal is available, while setting the availability state of the mobile terminal A1 having the device number MSI1, which has been communicating, to "0", indicating that the terminal is unavailable.

Upon receiving the information rewrite response from the service control station 30, the switching station 21 performs a transfer process from the mobile terminal A1 to the mobile terminal A2 (step S12), and then transmits a transfer request response to the mobile terminal A2 (step S13).

This process clears a call setup with the mobile terminal A1 and performs a call setup with the mobile terminal A2, thus establishing communications between the mobile terminal B1 and the mobile terminal A2 (step S14).

Further, at step S9, if this subscriber is not communicating when the service control station 30 receives the information rewrite request based on a transfer, the service control section 30 determines that the transfer process is not to be permitted and then transmits an information rewrite response to the switching station 21 (step S15). The switching station 21, which has been notified that the transfer process is not to be permitted, transmits a transfer request reject signal to the mobile terminal A1 to stop the transfer process (step S16).

In the above description, it is assumed that the user is a multiple terminal subscriber, but a user who is not a multiple terminal subscriber can perform the switching and transferring process by directly rewriting the device number MSI in the device number storage portion instead of rewriting the availability flag in the database 31 of the service control station 30.

As described above, by performing the authentication process and the switching process, if a user can use the same telephone number available for a plurality of mobile terminals, even if it has become difficulties continuing the communication due to the exhaustion of batteries, worsened conditions for radiowave propagation, a change in surrounding environments caused by movement, or the like while one of the mobile terminals is communicating, the user can continue a call being communicated by transferring the call to another available mobile terminal.

SECOND EXAMPLE

Next, a second embodiment of the present invention will be described with reference to FIG. 4. Description of the same components as those in the first example is omitted, and they are denoted by the same reference numerals.

This is an example in which a destination terminal performs a transfer request. The configuration of this system is the same as that of the system shown in FIGS. 1A and 1B for the above-described first example, and description thereof is thus omitted.

A process that the destination terminal performs a transfer request will be described below with reference to FIG. 4.

Figure 4:
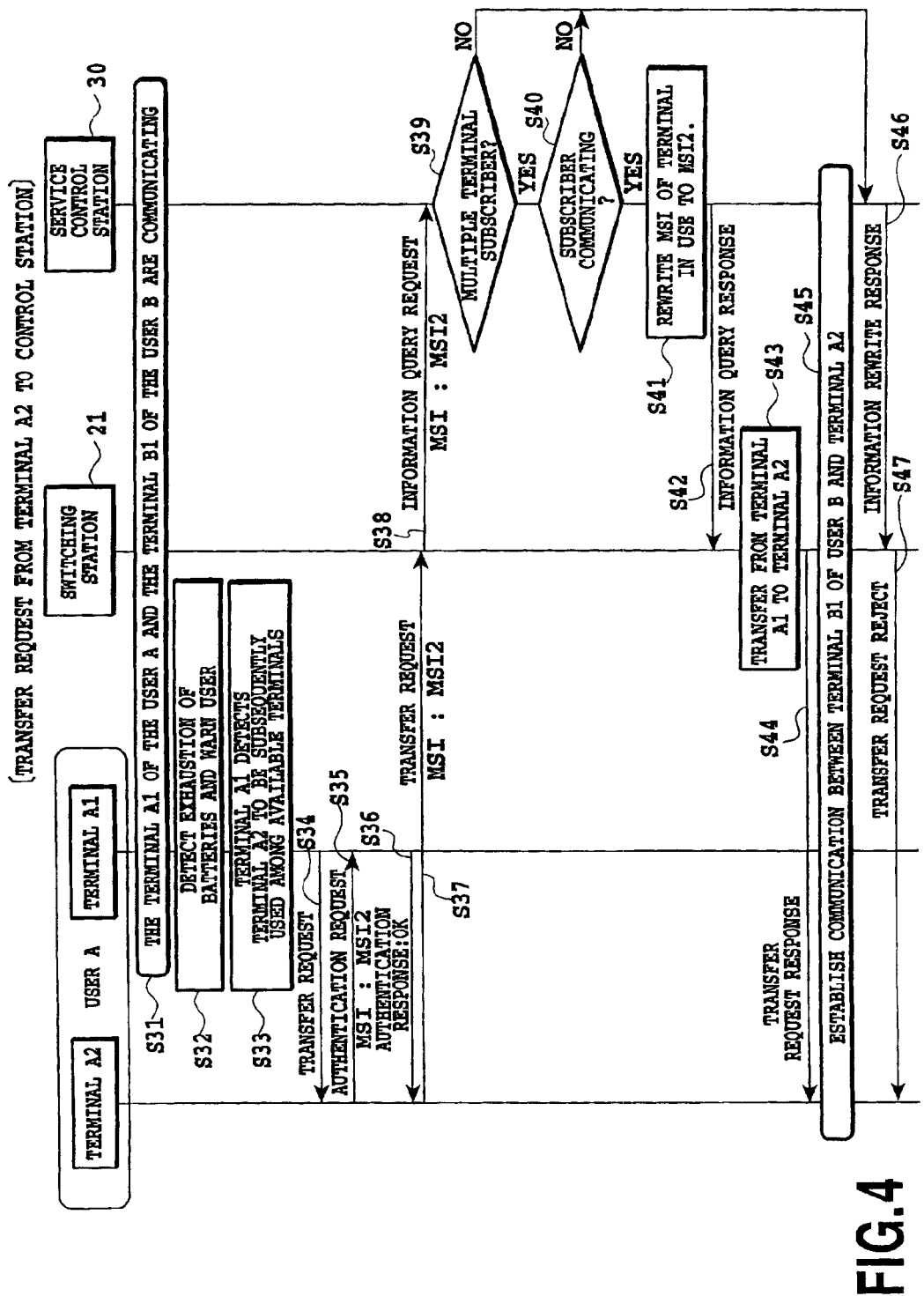
FIG. 4 is a flow chart showing an example of a process in the case of performing a transfer request during communication from a destination mobile terminal to a network according to a second embodiment of the present invention.

FIG. 4 shows an example of a sequence that while the user A is communicating by using the mobile terminal A1, the destination terminal performs a transfer request.

The user A is a multiple terminal subscriber and can use the mobile terminals A1, A2, and A3, to which the telephone number MSN1 is assigned. The mobile terminals A1, A2, and A3 have the device numbers MSI1, MSI2, and MSI3, respectively.

While the mobile terminal A1 of the user A and the mobile terminal B1 of the user B are communicating (step S31), if the mobile terminal A1 has become difficulty continuing the communication due to the exhaustion of batteries, it autonomously detects the exhaustion and warns the user A of the difficulty by activating an alarm, displaying a character message on a liquid crystal screen, or lighting a warning lamp (step S32).

The user A, who has been warned of the exhaustion, selects the mobile terminal A2 as one for continuing the current communication, among the mobile terminals A2 and A3 which can be used with the same telephone number MSN1 (step S33). The user A transmits a transfer request to the mobile terminal A2 (step S34).

In this case, means for selecting the mobile terminal A2 may be either a method of allowing the user A, who has been warned of the exhaustion, to intentionally select the mobile terminal A2 or a method of allowing the mobile terminal A1 to autonomously detect the mobile terminal A2.

Upon receiving the transfer request, the mobile terminal A2 makes an authentication request to the mobile terminal A1 (step S35).

The mobile terminal A1 performs an authentication process and transmits an authentication response to the mobile terminal A2 (step S36).

Once the authentication has been achieved, the mobile terminal A2 transmits a transfer request to the switching station 21 for a transfer process (step S37).

Upon receiving the transfer request from the mobile terminal A2, the switching station 21 transmits an information query request of the subscriber to the service control station 30 (step S38).

Upon receiving this request, the service control station 30 determines whether or not this subscriber is permitted in contracts of multiple terminals concerning the telephone number MSN1 (step S39). If the subscriber is permitted in contracts of multiple terminals, then the service control section 30 shifts to a subsequent determination process.

If this subscriber is permitted in contracts of multiple terminals concerning the telephone number MSN1, then the service control section 30 determines whether or not other mobile terminals except the mobile terminal A2, which has transmitted the transfer request, are being communicated, among all the mobile terminals A1 to A3 associated with the telephone number MSN1.

If the service control section 30 determines that any of the mobile terminals except the mobile terminal A2 is being communicated, it assumes that the transfer is to be permitted, and then rewrites the availability flag in the database 31 (step S41) to set it to "1", indicating that this terminal can be used for the terminal MSI2. Then, the service control section 30 transmits an information query response to the switching station 21.

This process sets the availability state of the mobile terminal A2 having the device number MSI2 to "1", indicating that the terminal is available, while setting the availability state of the mobile terminal A1 having the device number MSI1, which has been being communicated, to "0", indicating that the terminal is unavailable.

However, when it has been determined whether or not any of the mobile terminals except the mobile terminal A2 is being communicated, further, in the case of identifying the mobile terminal is being communicated, the information concerning all the mobile terminals that can share the same telephone number is stored previously in the database 31, and then when an information concerning a transfer request is transmitted from the mobile terminal A2, the stored information is referred, thus identifying the mobile terminal being communicated.

If it has been determined that the subscriber is permitted in contrasts of multiple terminals and that other terminals (in this case, the mobile terminal A1) of the subscriber is being communicated, the switching station 21, which has received the information query response, transfers the call being communicated from the mobile terminal A1 to the mobile terminal A2 (step S43).

After ascertaining that the communication with the mobile terminal A1 has ended, the switching station 21 transmits a transfer request response to the mobile terminal A2 (step S44).

When the mobile terminal A2 receives the transfer request response from the switching station 21, communications between the mobile terminal A2 of the user A and the mobile terminal B1 of the user B are established (step S45).

If the subscriber is not permitted in contrasts of multiple terminals concerning the telephone number MSN1 or the mobile terminals except the mobile terminal A2, which has performed the transfer request, are not being communicated, then the service control station 30 communicates this state to the switching station 21 as an information query response (step S46). Upon receiving this response, the switching station 21 rejects a call transfer and then transmits a transfer request reject response to the mobile terminal A2 (step S47).

In this example, the timing for detecting a transfer is regarded as when the batteries are exhausted, but this may be based on any factor that the mobile terminal has difficulty in continuing the communication such as worsened radiowave conditions.

As the timing for performing a transfer autonomously by the mobile terminal, not only detecting the difficulty of the communication continuation but also detecting a more appropriate terminal nearby can also be performed. For example, when the user gets in a car while communicating with a portable mobile terminal, this terminal detects a high-power vehicle-mounted mobile telephone, or while the user is communicating data by using a single portable mobile terminal, this terminal detects a car navigation system.

Further, the present invention is not limited to sounds, but a similar concept is applicable to data communications such as distribution of texts, images, or animated images.

As an application for multimedia communications, when a transmitter or the service control station 30 is provided with connection service information on the current call and a receiver is notified of the connection service information. Therefore, for example, when animated images are to be transmitted, on condition that the available mobile terminal can deal with only sound communications, the mobile terminal can autonomously alter itself.

As described above, according to the present invention, any one of the plurality of terminals sharing the same number determines whether or not to switch a transfer to another terminal sharing the same number. If it determines that the transfer is to be switched, it authenticates one terminal among the other terminals sharing the same number, and then outputs a transfer switching request according to the authenticated terminal to the communication control station. The communication control station performs a transfer switching process concerning the authenticated terminal based on the transfer switching request outputted by the first terminal. Consequently, when the user can use the same number with a plurality of mobile terminals, if one of the mobile terminals has the difficulty of continuing the communication or the user desires to continue the communication by using another mobile terminal, then the call being communicated can be continued by allowing a second mobile terminal with which the communication is to be continued to make a transfer request or allowing the communicating terminal to autonomously make a transfer request to the second terminal. Therefore, the user's convenience can be improved.

Further, in the conventional transfer services to another number communication charges not only at the source terminal but also from the source terminal to the destination terminal are imposed. However, according to the present invention, the switch and transfer process is performed by using the same number to avoid communication charges associated with this process, thereby achieving convenient and economical communications.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A mobile communication method for controlling transfer switching for communication between a plurality of mobile terminals sharing the same number used by the same subscriber, the method comprising the steps of:

detecting a mobile terminal among said other terminals sharing the same number used by the same subscriber;

transmitting a transfer request for switching to the detected mobile terminal sharing the same number used by the same subscriber;

determining whether or not to switch a transfer to any of the mobile terminals sharing the same number used by the same subscriber;

authenticating, if it is determined that the transfer is to be switched, the detected mobile terminal, which received the transmitted transfer request, based on an authentication request received from the detected mobile terminal;

transmitting a transfer request for an information rewrite request to a communication control station when the result of authentication is affirmative; and performing a process of switching the transfer to said authenticated mobile terminal based on said transfer switching request outputted from one mobile terminal from among the plurality of mobile terminals sharing the same number used by the same subscriber.

2. The mobile communication method as claimed in claim 1, wherein if said one mobile terminal from among the plurality of mobile terminals sharing the same number used by the same subscriber is communicating, this mobile terminal authenticates another mobile terminal among the plurality of mobile terminals sharing the same number used by the same subscriber, and said authenticating mobile terminal outputs a transfer switching request for switching to said authenticated another mobile terminal sharing the same number used by the same subscriber to said communication control station.

3. The mobile communication method as claimed in claim 1, wherein if said one mobile terminal among the plurality of mobile terminals sharing the same number used by the same subscriber is communicating, this mobile terminal authenticates another mobile terminal among the plurality of mobile terminals sharing the same number used by the same subscriber, and said another mobile authenticated terminal outputs a transfer switching request for switching to itself to said communication control station.

4. The mobile communication method as claimed in anyone of claims 1 to 3, in said communication control station, said method further comprising the steps of:

storing a switching request information concerning the transfer switching request corresponding to each said mobile terminal sharing the same number used by the same subscriber;

determining whether said authenticating mobile terminal or said authenticated another mobile terminal has provided output;

performing, if it is determined that said authenticated another mobile terminal has provided output, a process of switching communication based on said stored switching request information.

5. A mobile communication system for controlling transfer switching communication between a plurality of mobile terminals sharing the same number used by the same subscriber, anyone of said plurality of terminals comprising:

detection means for detecting a mobile terminal among said other terminals sharing the same number used by the same subscriber;

transfer request means for transmitting a transfer request for switching to the detected mobile terminal sharing the same number used by the same subscriber;

determination means for determining whether or not to switch a transfer to any of the mobile terminals sharing the same number used by the same subscriber;

authentication means for authenticating, if it is determined that the transfer is to be switched, one of said terminals sharing the same number to which the transfer is switched, the detected mobile terminal, which received the transmitted transfer request, based on an authentication request received from the detected mobile terminal; and rewrite request means for transmitting a transfer request for an information rewrite request to a communication control station when the result of the authentication is affirmative, and said communication control station comprises:

transfer switching means for performing a process of switching the transfer to said authenticated terminal based on said transfer switching request outputted from one mobile terminal from among the plurality of mobile terminals sharing the same number used by the same subscriber.

6. The mobile communication system as claimed in claim 5, wherein if said one mobile terminal from among the plurality of mobile terminals sharing the same number used by the same subscriber is communicating, this mobile terminal authenticates another mobile terminal among the plurality of mobile terminals sharing the same number used by the same subscriber, and said authenticating mobile terminal outputs a transfer switching request for switching to said authenticated another mobile terminal sharing the same number used by the same subscriber to said communication control station.

7. The mobile communication system as claimed in claim 5, wherein:

if said one mobile terminal among the plurality of mobile terminals sharing the same number used by the same subscriber is communicating, this mobile terminal authenticates another mobile terminal among the plurality of mobile terminals sharing the same number used by the same subscriber, and said another mobile authenticated terminal outputs a transfer switching request for switching to itself to said communication control station.

8. The mobile communication system as claimed in anyone of claims 5 to 7, said communication control station further comprising:

storage means for storing a switching request information concerning the transfer switching request corresponding to each said mobile terminal sharing the same number used by the same subscriber;

determination means for determining whether said authenticating mobile terminal or said authenticated another terminal has provided output, a; and control means for performing, if it is determined that said authenticated another mobile terminal has provided output, a process of switching communication based on said switching request information stored in said storage means.

9. A communication control station for controlling transfer switching for communication between a plurality of mobile terminals sharing the same number used by the same subscriber, the station comprising:

storage means for storing switching request information concerning a transfer switching request for each said mobile terminal sharing the same number used by the same subscriber, determination means for determining whether an authenticating mobile terminal or authenticated another mobile terminal has provided output; and control means for performing a transfer switching process based on said switching request information stored in said storage means when it is determined that said authenticated another mobile terminal has provided output.

10. The communication control station as claimed in claim 9, wherein said switching request information stored in said storage means includes the same number shared among mobile terminals, a device number, location information and an availability flag, the same number is shared so that authenticated another terminal instead of an authenticating terminal shared the same number used by the same subscriber communicates with a terminal used by a different subscriber, and the location information and the availability flag correspond to the device number.

11. A terminal device for controlling transfer switching for communication between other mobile terminals sharing the same number used by the same subscriber, the terminal device comprising:

detection means for detecting a mobile terminal among said other mobile terminals sharing the same number used by the same subscriber;

transfer request means for transmitting a transfer request for switching to the detected mobile terminal sharing the same number used by the same subscriber:

determination means for determining whether or not to switch a transfer to any of the mobile terminals sharing the same number used by the same subscriber;

authentication means for authenticating, if it is determined that the transfer is to be switched, the detected mobile terminal, which received the transmitted transfer request, based on an authentication request received from the detected mobile terminal; and rewrite request means for transmitting a transfer request for an information rewrite request to a communication control station when the result of the authentication is affirmative.

12. The terminal device as claimed in claim 11, wherein the authenticating terminal device transmits said transfer request for said information rewrite request to a communication control station.

13. The terminal device as claimed in claim 11, wherein the authenticated terminal device transmits said transfer request for said information rewrite request to a communication control station.

* * * * *

UNITED STATES PATENT AND TRADEMARK OFFICE
CERTIFICATE OF CORRECTION

PATENT NO. : 6,915,136 B2
DATED : July 5, 2005
INVENTOR(S) : Yoko Kikuta and Masami Yabusaki It is certified that error appears in the above-identified patent and that said Letters Patent is hereby corrected as shown below:

Column 1,
Line 19, remove "become".
Line 35, after "limited" remove "to".

Column 6,
Line 4, before "difficulty" remove "become the".

Column 7,
Line 7, before "difficulties" remove "become".
Line 36, before "difficulty" remove "become".

Column 10,
Line 50, after "switching" insert -- for --.

Signed and Sealed this

Sixth Day of December, 2005

JON W. DUDAS
*Director of the United States Patent and Trademark Office*